US012230112B2

(12) United States Patent
Miller et al.

(10) Patent No.: US 12,230,112 B2
(45) Date of Patent: Feb. 18, 2025

(54) ARTICLE SURVEILLANCE TAG

(71) Applicant: Sensormatic Electronics, LLC, Boca Raton, FL (US)

(72) Inventors: Channing Everet Miller, Fort Lauderdale, FL (US); Edward Paul Ellers, Boca Raton, FL (US); Fernando Bienvenido Moronta, Deerfield Beach, FL (US); Laurentiu Petrisor, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 18/064,042

(22) Filed: Dec. 9, 2022

(65) Prior Publication Data

US 2023/0186743 A1 Jun. 15, 2023

Related U.S. Application Data

(60) Provisional application No. 63/288,402, filed on Dec. 10, 2021.

(51) Int. Cl.
*G08B 13/24* (2006.01)
*G08B 7/06* (2006.01)

(52) U.S. Cl.
CPC ........... *G08B 13/2434* (2013.01); *G08B 7/06* (2013.01); *G08B 13/2431* (2013.01)

(58) Field of Classification Search
CPC ........................ G08B 13/2434; G08B 13/2465
USPC ....................................................... 340/572.8
See application file for complete search history.

(56) References Cited

U.S. PATENT DOCUMENTS 9,336,668 B2 5/2016 Luo
2015/0048946 A1 2/2015 Luo
2017/0193777 A1 7/2017 Sayegh et al.
2019/0017295 A1* 1/2019 Schneider .......... G08B 13/2434
2021/0396051 A1 12/2021 Perreau et al.
2022/0207975 A1* 6/2022 Sandoval ........... G08B 13/2448
2022/0406156 A1* 12/2022 Napthine ............ E05B 73/0017
(Continued)

FOREIGN PATENT DOCUMENTS

WO 2020112972 A1 6/2020

OTHER PUBLICATIONS

EAS RF Pinless Tag for clothes security, Virginland Techonlogy Co., Limited, [retrieved on Jan. 13, 2023]. Retrieved from the Internet: <URL:https://virginlandeas.diytrade.com/sdp/1961099/4/pd/10937949-2524183/EAS_RF_Pinless_Tag_for_clothes_security.html>, 2 pages.

(Continued)

*Primary Examiner* — Jack K Wang
(74) *Attorney, Agent, or Firm* — ArentFox Schiff LLP

(57) ABSTRACT

The present disclosure relates generally to security tags, and more specifically relates to electronic article surveillance (EAS) tags. The tag prevents unauthorized removal of an article as well as triggers an alarm when the tag is attempted for tampering. The tag comprises a housing, a switch, and a processing circuit. The switch includes a first contact coupled with the housing and a second contact coupled with an article. The second contact is movable relative to the first contact. The processing circuit is provided to detect electrical disconnection between the first contact and the second contact, and trigger an alarm upon detecting the electrical disconnection.

17 Claims, 10 Drawing Sheets

(56) References Cited

U.S. PATENT DOCUMENTS

| | | | | |
|---|---|---|---|---|
| 2023/0154301 | A1* | 5/2023 | Eden | G06Q 20/208 705/39 |
| 2023/0417084 | A1* | 12/2023 | Lynch | G08B 13/2434 |

OTHER PUBLICATIONS

T721/C Mussel Tag-Pinless Alarming Tag, Century, 2017 [retrieved on Jan. 13, 2023]. Retrieved from the Internet: <URL:http://www.century-cn.com/Products/EAS/AlarmingTags/68/1046>, 2 pages.

International Search Report and Written Opinion in PCT/US2022/081302, mailed Mar. 20, 2023, 14 pages.

* cited by examiner

3

ARTICLE SURVEILLANCE TAG

CROSS REFERENCE TO RELATED APPLICATIONS

This application claims priority to U.S. Provisional Patent Application No. 63/288,402, filed Dec. 10, 2021, the entire contents of which are hereby incorporated in their entirety.

BACKGROUND

The present disclosure relates generally to security tags, and more specifically relates to electronic article surveillance (EAS) tags.

An electronic article surveillance (EAS) tag is typically utilized and attached to an article to prevent unauthorized removal of the article from a retail space (e.g., a retail store). Subsequent to proper purchase of the article, the EAS tag is removed by an authorized person of the retail space.

Conventional tags include a tack that passes through an article and is received in a housing of the tag. The housing includes a slot in which a locking member, made of ferromagnetic material, and locking elements, typically metal balls, are placed. The locking member and the locking elements are attached to a spring. The spring remains in an uncompressed state when the tag is active. The tack is received in the slot by passing through the locking member. The locking member includes an aperture or can be made hollow to facilitate passing of the tack therethrough. The tack is provided with one or more notches that receive the locking elements in active state of the tag. Once the tack is inserted in the slot, the locking elements engage with the one or more notches and prevent removal of the tack from the slot. To safely detach the tag from the article, a magnet is used to pull the locking member and locking elements in a direction opposite to a head of the tack. Due to this, the locking elements disperse from the notch and the tack is safely removed from the housing, thereby separating the tag from the article. However, such EAS tags possess certain drawbacks. The tags are easy to tamper. The tack can be removed from the housing of the tag by damaging the tag. For example, the tack can be removed by opening the housing using sharp edge tools such as pliers. Once the tag is separated, unauthorized removal of the article cannot be detected. Further, such EAS tags do not have any provision to raise alarm or generate any signal when the tag is attempted to be tampered.

Therefore, there is felt a need of a tag that alleviates the abovementioned drawbacks of conventional EAS tags and prevent unauthorized removal of an article from a particular space.

SUMMARY

The present disclosure envisages an article surveillance tag (hereinafter also referred as "tag"). The tag comprises a housing, a switch, and a processing circuit. The switch includes a first contact coupled with the housing and a second contact coupled with an article via a pad. Displacement of the pad with respect to the housing results in displacement of second contact relative to the first contact. Substantial displacement of a second pad disconnects electrical connection between first and second contacts. The processing circuit triggers an alarm upon detecting electrical disconnection between the first contact and the second contact.

In one aspect of the disclosure, the first contact is supported by one or more brackets provided within the housing.

In another aspect of the disclosure, the second contact is arranged in the housing and coupled with the article via the pad that extends from the housing.

In another aspect of the disclosure, one or more resilient members are provided between second contact and housing to allow the second contact to regain an original position after displacement.

In another aspect of the disclosure, the processing circuit determines electrical disconnection based on one of current levels or voltage levels.

In another aspect of the disclosure, the tag includes a locking arm extending from the housing, wherein the article is placed in a space defined between the locking arm and the housing. The tag includes a lock for retaining a position of the locking arm.

In another aspect of the disclosure, the locking arm is receivable in a channel configured in the housing and a biasing member is arranged between a base of the channel and an end of the locking arm received in the channel, the biasing member is configured to be compressed when the locking arm is depressed in the channel.

In another aspect of the disclosure, the tag houses a control mechanism that determines the position of locking arm and allows power supply to processing circuit when the locking arm is depressed in the channel.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

An article surveillance tag is utilized to prevent unauthorized removal of an article from a retail space or controlled area by triggering an alarm when a theft is attempted, i.e., a person attempts to leave the retail space without following checkout procedure(s) or purchasing the article. The article surveillance tag (hereinafter also referred as "tag") of the present disclosure provides an additional layer of security, where an alarm is triggered when the tag is tampered with. Tampering can mean throughout the disclosure to be attempted and/or actual tampering.

The tag of the present disclosure is described in more details with reference to accompanying FIGS. 1-10.

Figure 1:
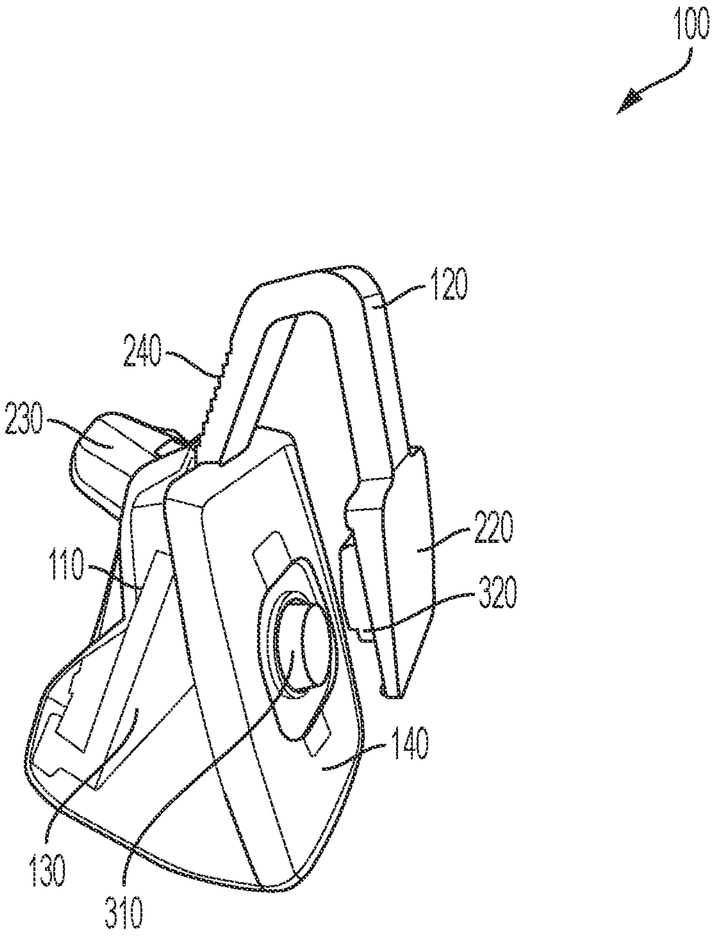
FIG. 1 is an isometric view of an article surveillance tag (hereinafter also referred as tag), in accordance with aspects of the present disclosure.
Figure 2:
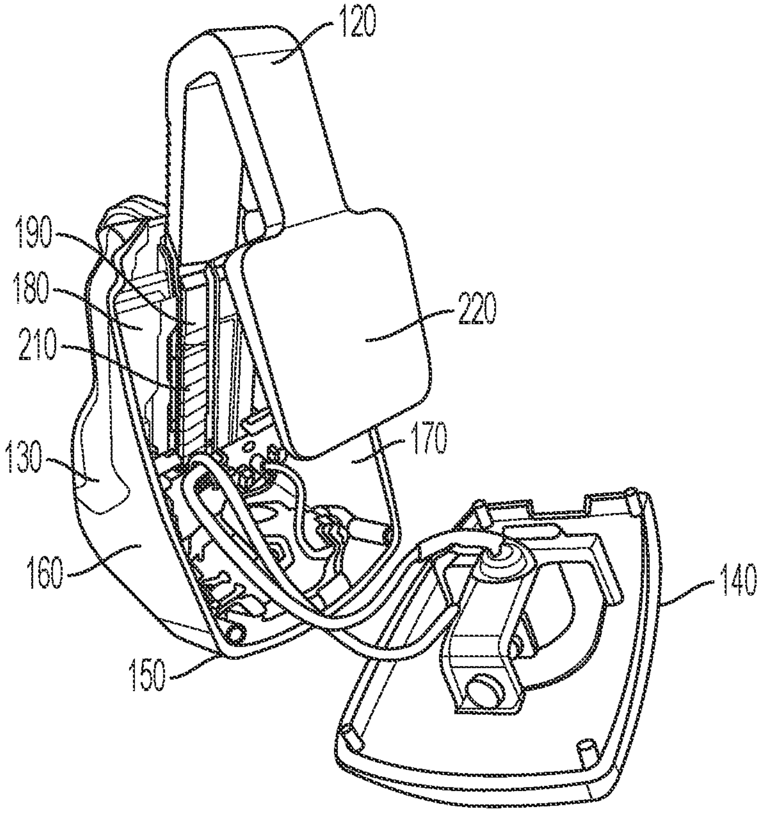
FIG. 2 is an isometric view of the tag of FIG. 1 depicting components within a housing of the tag, in accordance with aspects of the present disclosure.
Figure 3:
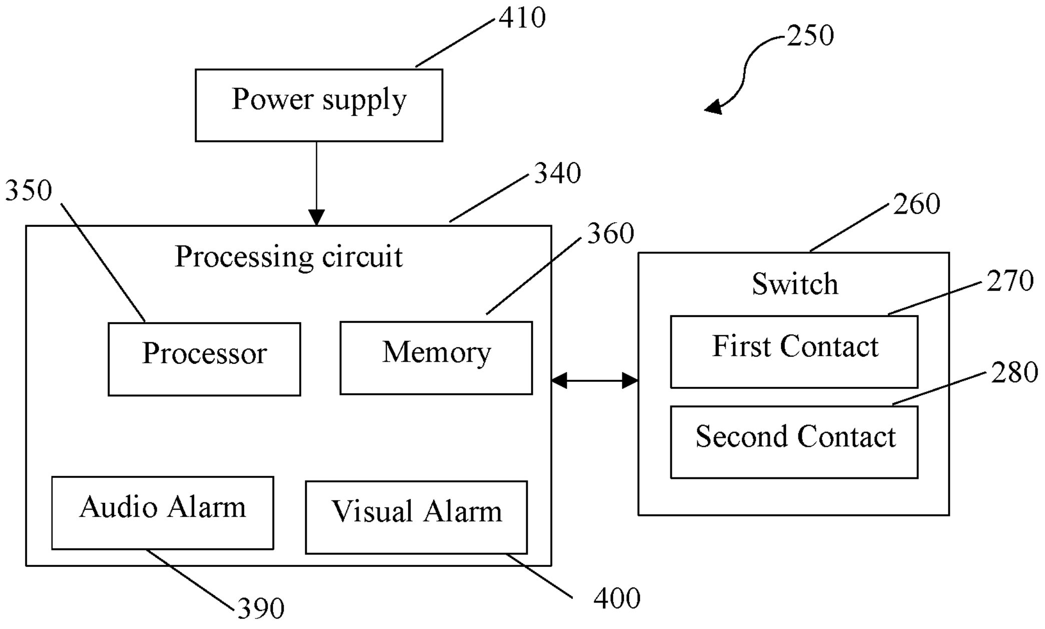
FIG. 3 is a block diagram depicting electrical communication between components of the tag, in accordance with aspects of the present disclosure.
Figure 4:
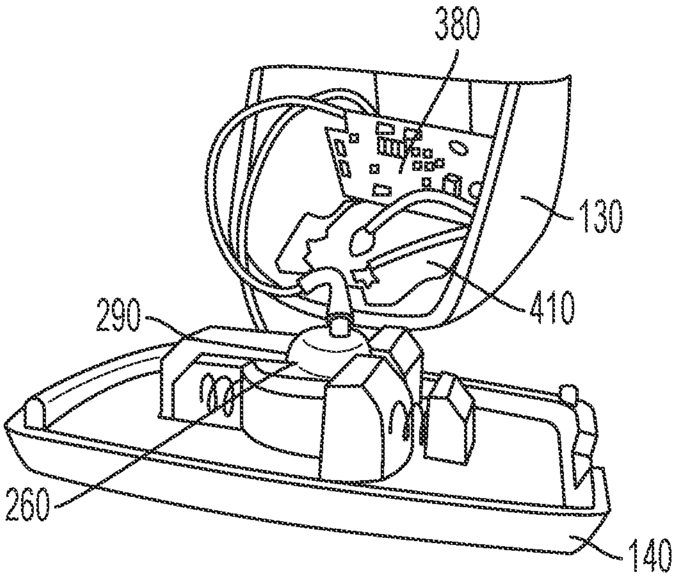
FIG. 4 is another isometric view of the tag of FIG. 1 depicting components in a housing of the tag, in accordance with aspects of the present disclosure.
Figure 5:
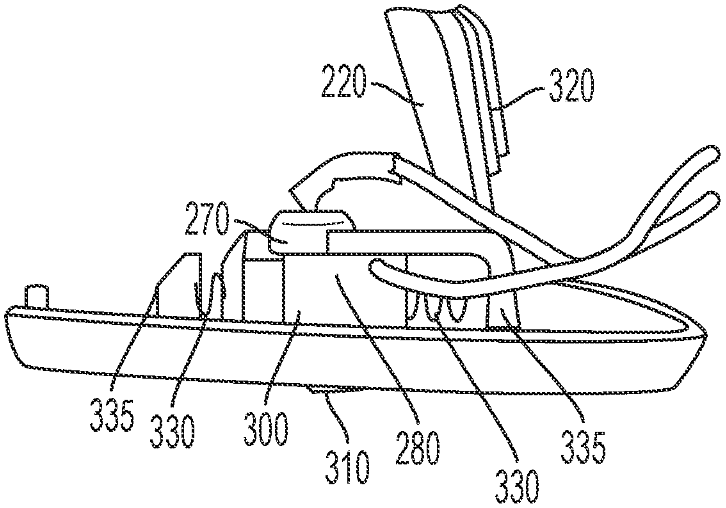
FIG. 5 is a detailed view of the tag, in accordance with aspects of the present disclosure.
Figure 6:
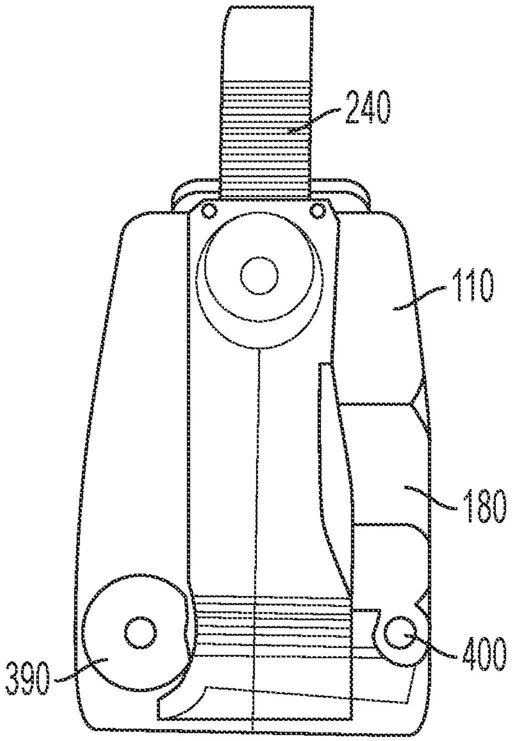
FIG. 6 is a rear view of the tag of FIG. 1, in accordance with aspects of the present disclosure.

Referring to FIGS. 1 and 2, a tag 100 is shown in accordance with various aspects of the present disclosure. The tag 100 includes a housing 110 and a locking arm 120 that extends from the housing. The housing 110 can have any suitable shape and size such that various components of the tag 100 can be accommodated in the housing. Additionally, the shape and size of housing 110 can be as per profile of the article that is to be secured. In some aspects, the housing 110 includes a first part 130 and a second part 140. The first part 130 has a hollow configuration and is open from one side or end to facilitate placement of and access to various components therein. As shown in FIG. 2, the first part 130 has a first side 150, a second side 160, a third side 170, and a fourth side 180. The first side 150 is substantially flat. Further, the second side 160 and the third side 170 are substantially parallel to each other and substantially orthogonal to the fourth side 180. Edges where the fourth side 180 meets the second side 160 and the third side 170 are configured blunt by filleting to prevent injury to a person handling the tag 100. In some aspects, the sides of the first part 130 are made integral so that the first part 130 can have a monolithic block structure. In some aspects, the first part 130 can be made spherical, conical, hemi-spherical or of any other suitable geometrical shape and provided with a provision to facilitate disposing of various components therein. However, the first part 130 can have any suitable shape and size in other aspects of the present disclosure.

The second part 140 is coupled with the first part 130 to seal open side of the first part 130. The second part 140 can be detachably or fixedly coupled with the first part 130 such that the second part 140 cannot be easily separated from the first part 130. In some aspects, the second part 140 is snap fitted onto the first part 130. In some other aspects, the second part can be attached to the first part via hinges. In some other aspects, the second part can be attached to the first part via fasteners that cannot be easily accessed. In another aspects of the disclosure the first part 130 and the second part 140 may be connected in a manner that only authorized users are able to open. For example, necessary to change a power source or component. An authorized user may use a key or tool to separate the first part 130 from the second part 140.

The housing 110 can be made of any suitable material having certain strength against breaking force so that an attempt to tamper the housing 110 can be resisted to a certain extent. In some aspects, the housing 110 can be made of transparent material (e.g., plastic or any other suitable polymer-based material). In some aspects, the housing 110 can be made of semi-transparent or opaque material. In another aspect of the disclosure, the housing may be constructed of an unbreakable or nearly unbreakable material, such as a polycarbonate. Any other similar material may be implemented. The material is selected to ensure that it would not interfere with the components within the housing.

The locking arm 120 extends from the housing 110. The locking arm 120 is partially received in a channel 190 provided in the housing 110. In some aspects, the channel 190 is provided proximal to the fourth side 180 of the housing 110. In some aspects, the channel 190 extends along length of fourth side 180 and is accessible from top of the housing 110 to receive the locking arm 120. In some aspects, the channel 190 is a pocket or an elongated slot. In some aspects, the channel 190 can be provided within the housing 110 or abutting an inner or outer surface of the housing 110.

In some aspects, the locking arm 120 is provided with a biasing member 210. In some aspects, the biasing member can be provided partially on the locking arm 120. In some aspects, the biasing member 210 can be provided in the channel 190, wherein one end of the biasing member 210 is coupled with a base of the channel 190 and the other end is coupled with an end of the locking arm 120 received in the channel 190. In some aspects, the biasing member 210 is a compression spring, wherein the spring is compressed upon displacing the locking arm 120 towards the spring or the base of the channel 190. In other words, the biasing member 210 is compressed when the tag 100 is in locked state and the biasing member 210 is decompressed when the tag 100 is in unlocked state.

In other aspects of the disclosure, the locking arm 120 includes notches or steps and is configured to work cooperatively with the channel 190. For example, the locking arm 120 is lowered into the channel 190, lowering the locking arm 120 into the housing. The channel includes a locking mechanism (not shown) in the housing 110 which engages with the notch or notches in the locking arm 120 to secure the locking arm 120 from being moving in an opposite direction. In other words, the notches or steps on the locking arm 120 work as a racketing mechanism in conjunction with the channel 190 and the locking mechanism (not shown).

In one aspect of the disclosure, the locking arm 120 is provide to the channel 190 at an angle thereby having the free end 220, discussed below, engage with a product to be secured at roughly a forty-five degree (45°) angle. In other words, the free end 220 moves in a diagonal fashion as the locking arm 120 is lowered into the channel 190 of the housing 110.

In some aspects, the channel 190 is provided with a restrictor (not shown) that prevents complete removal of the locking arm 120 from the channel 190.

In some aspects, the locking arm 120 has an arcuate shaped configuration such that a free end 220 of the locking arm 120 faces the housing 110. In some aspects, the free end 220 of the locking arm 120 faces a substantial middle portion of the second part 140 of the housing 110. In some aspects, the free end 220 has quadrilateral shape having width more than remaining portion of the locking arm 120. In some aspects, the locking arm 120 can have 'U' or 'V' shaped configuration. Due to the arcuate configuration of locking arm 120, a space is defined between the housing 110 and the locking arm 120. A portion of article is typically received in this space when the tag 100 is coupled with the article.

The tag 100 includes a lock 230 provided for retaining the locking arm 120 in a particular position both in locked and unlocked state of the tag 100. In some aspects, the lock 230 retains the position of the locking arm 120 when the locking arm 120 is pressed or lowered towards the base of the channel 190. In some aspects, the locking arm 120 includes multiple engageable means 240 that can be engaged with the lock 230 so that the locking arm 120 can be retained at different locking positions. The engageable means 240 can be crests and troughs formed on the locking arm 120, as described above. In some aspects, the engageable means 240 can be notches, slots, recesses etc., as described above.

In some aspects, the lock 230 includes locking members (not shown in figures) made of ferromagnetic materials. The locking members engage with engageable means 240 to retain the position of the locking arm corresponding to that engageable means 240. In some aspects, the locking members include spherical ferromagnetic components and a ferromagnetic block. The lock 230 can be provided with a restraining mechanism that allows displacement of the locking arm 120 only in one direction (for example, towards the base of the channel 190). In some aspects, the restraining mechanism can include a ratchet (not shown) that engages with the engageable means 240. When the locking arm 120 is sufficiently displaced within the channel 190, the lock 230 engages with the locking arm 120 and prevents displacement of the locking arm 120 at least out of the channel 190 so that the tag 100 remains attached to an article in which unauthorized removal is to be prevented.

Unlocking means is employed to disconnect the lock 230 from the locking arm 120. It is to be noted that the configuration of unlocking means is dependent on configuration of the lock 230. For example, in case of the lock 230 being made of ferromagnetic materials, the unlocking means can include a magnet. However, it is to be noted that the configuration of the lock 230 and the unlocking means is not limited to ferromagnetic material and magnet respectively. Various other locks and complementary locking means can be employed to retail the locking arm 120 at a particular position to keep the tag 100 locked.

The tag 100 includes an electronic circuit 250 provided to trigger an alarm when the tag 100 tampered with or unauthorized removal of the article is attempted. In one aspect of the disclosure, the alarm may be an audible, visual or combination type of alert. Referring to FIGS. 2-6, 10*a* and 10*b* illustrate various components of the circuit 250.

The circuit 250 includes a switch 260. The switch 260 is arranged in the housing 110. The switch 260 includes a first contact 270 and a second contact 280. The contacts 270, 280 are arranged within the housing 110. In some aspects, the contacts 270, 280 are metallic and can carry electric current therethrough. In some aspects, the contacts 270, 280 are metallic plates. In alternative aspects, the contacts 270, 280 can be of any shape and size other than plates.

The first contact 270 is mounted in the housing 110 using one or more brackets 290. In some aspects, the bracket 290 is coupled with an inner portion of the second part 140 of the housing 110. In some other aspects, the bracket can be attached to other suitable locations within the housing 110.

The second contact 280 is arranged within the housing 110 such that it abuts the first contact 270. The second contact 280 is supported by a contact carrier 300. The tag 100 includes a pad 310 which is provided to be in contact with the second contact 280 and an article to which the tag 100 is attached. The second contact 280 displaces with the pad 310. The housing 110 includes a hole to provide a passage to the pad 310. The pad 310 can be made of any suitable material. In some aspects, the pad 310 is a rubber pad. In another aspect of the disclosure, the pad 310 may be constructed of any material which provides friction or grip when the tag is engaged with an article. The article is held between the pad 310 and the free end 220 of the locking arm 120 when the tag is attached to the article. In some aspects, the free end 220 is provided with a cushioning member 320 to abut the article. Typically, the pad 310 and the cushioning member 320 abut opposite surfaces or sides of the article. In another aspect of the disclosure, the cushioning member 320 may be constructed of any material which provides friction or grip when the tag is engaged with an article. The pad 310 and the cushioning member 320 can have mating features for securely gripping them onto an article or to create a strong friction between pads and the article. The pad 310 and the cushioning member 320 have high friction surfaces therefore, tampering or pulling of the tag 100 causes the second contact 280 to move with respect to the housing 110, more specifically with respect to the first contact 270, thereby breaking the electrical contact between the first contact 270 and the second contact 280. The electrical contact breaks when there is sufficient displacement of the second contact 280 with respect to the first contact 270.

The tag 100 includes one or more resilient members 330 provided in the housing 110 to allow the second contact 280 to regain an original position after displacement. Typically, while handling the article having tag 100 or the tag 100 alone, the pad 310 tends to displace with respect to the housing 110 resulting in displacement of the second contact 280 in the housing 110 as both the pad 310 and the second contact 280 are physically connected. Thus, the resilient members 330 displace with the second contact 280 and regain their original position when the force exerted on the pad 310 is removed. In some aspects, the resilient members 330 are coupled between the contact carrier 300 and the housing 110. In some aspects, one or more support members 335 are provided at inner surfaces of the housing 110 to facilitate connection of the resilient members 330. In some aspects, the support members 335 are provided at an inner surface of the second part 140 of the housing 110. In some aspects, the brackets 290 are utilized as supports for the resilient members 330. The number and position of the resilient members 330 are determined as per the application requirement. In some aspects, the tag 100 includes two resilient members 330 provided at opposite sides of the contact carrier 300. In some aspects, the resilient members 330 are provided in the direction along X axis, Y axis, Z axis or in combination of two or three axes so that the second contact 280 can regain its position if displaced in any direction.

In some aspects, the resilient members 330 are springs which are compressed when the second contact 280 is sufficiently displaced along with the pad 310. The springs regain their original position when the pad 310 stops displacing with respect to the housing 110, thereby resulting in regaining the original position of the second contact 280. In some other aspects, the resilient members can be made of shape memory alloys. In some other aspects, the resilient members are made of rubber or silicon. In some other aspects, the resilient members include Hall effect magnets.

In one aspect of the disclosure, the top resilient member 330 and the bottom resilient member 330 contain and align the second contact 280 within the contact carrier 300. The resilient members 330 allow the second contact 280 to stay in a neutral position when in a stead state. In the neutral position, the first contact 270 and the second contact 280 are configured to touch each other in a center point position.

The circuit 250 includes a processing circuit 340 electrically coupled with the switch 260 and is provided to detect electrical disconnection between the first contact 270 and the second contact 280. More specifically, the disconnection between the first contact 270 and the second contact 280 occurs when the tag 100 is tampered with. When the tag is attempted for tampering, the pad 310 is displaced with respect to the housing 110, thereby displacing the second contact 280 away from the first contact 270. The processing circuit 340 detects such disconnection and triggers an alarm, as described above, and provides a notification to third parties about the attempted tampering. In another aspect of the disclosure, the alarm may also send a signal to a remote server indicating a disconnection or tampering. The dimensions of the first contact 270 and the second contact 280 are determined such that the electrical connection between the first contact 270 and the second contact 280 remains active upon slight displacement of the pad 310 during routine activities such as picking up articles, transportation, trying on an article and other typical daily activity. However, the electrical connection between first contact 270 and the second contact 280 breaks when the second contact 280 is displaced sufficiently with respect to the first contact 270 due to displacement of the pad, which typically occurs during tampering attempt. When sufficient pull force is exerted on the tag 100 (for example, during tampering the tag 100), the first contact 270 surpasses the predetermined range of movement and the electrical contact between the first contact 270 and the second contact 280 breaks. The processing circuit 340 senses the disconnection and triggers an alarm.

In some aspects, the processing circuit 340 includes a processor 350 and a memory 360. Processor 350 may be a general purpose or specific purpose processor, an application specific integrated circuit (ASIC), one or more field programmable gate arrays (FPGAs), a group of processing components, or other suitable processing components. Processor 350 is configured to execute computer code or instructions stored in memory 360 or received from other computer readable media (e.g., CDROM, network storage, a remote server, etc.).

Memory 360 may include one or more devices (e.g., memory units, memory devices, storage devices, etc.) for storing data and/or computer code for completing and/or facilitating the various processes described in the present disclosure. Memory 360 may include random access memory (RAM), read-only memory (ROM), hard drive storage, temporary storage, non-volatile memory, flash memory, optical memory, or any other suitable memory for storing software objects and/or computer instructions. Memory 360 may include database components, object code components, script components, or any other type of information structure for supporting the various activities and information structures described in the present disclosure. Memory 360 may be communicably coupled with processor 350 and may include computer code for executing (e.g., by processor 350) one or more processes described herein.

The processing circuit 340 can be provided with a logic that detects the disconnection between the first contact 270 and the second contact 280. In some aspects, the processing circuit 340 detects the disconnection based on voltage levels. In some other aspects, the processing circuit 340 detects electrical disconnection based on current levels. Memory 360 may include computer code for executing one or more processes described herein.

In some aspects, the processing circuit 340 is provided on a printed circuit board (PCB) 380 along with other necessary components of the circuit 250.

The printed circuit board 380 is provided with a control mechanism to determine the position of locking arm 120, allow power supply to the processing circuit 340 when the locking arm 120 is depressed in the channel 190, and restrict power supply to the processing circuit 340 when the locking arm 120 is in unlocked state, i.e., the biasing member 210 is in uncompressed state. In some aspects, the control mechanism can include a sensor to sense the position of the locking arm 120 in the channel 190. In some aspects, the control mechanism act as a key or a button that act as a switch. When the key is in ON condition, the processing circuit 340 receives the power for operation. Similarly, when the key is in OFF condition, power supply to the processing circuit 340 is interrupted. In some aspects, the key is set to ON condition by the locking arm 120. More specifically, when the locking arm 120 is depressed within the channel 190 towards the base of the channel 190, the locking arm 120 sets the key in ON condition. When the locking arm 120 is in unlocked state, the key is set in OFF condition. Thus, when the tag is locked onto an article, the key is in ON condition as the locking arm 120 is depressed in the channel 190. On the other hand, the key is in OFF condition when the tag 100 is in unlocked condition. In OFF condition, the processing circuit 340 does not generate any alarm. In some other aspects, the control mechanism can include a handle, a lever, a joystick, a circuit breaker, a switch or the like.

In some aspects, the processing circuit 340 detects the disconnection based on voltage levels. Upon detecting disconnection, the processing circuit 340 generates an alarm signal to trigger an alarm. The tag 100 can include various types of alarming devices. In some aspects, the processing circuit 340 includes an audio alarm 390 or a visual alarm 400 or combination of both audio alarm 390 and visual alarm 400. In some aspects, the visual alarm 400 is an LED lamp. In some aspects, a perforated cover can be provided on the audio alarm 390 and/or the visual alarm 400 for protection. The audio alarm 390 or the visual alarm 400 can be located suitably on the housing 110. In some aspects, the audio alarm 390 and the visual alarm 400 are located at the fourth side 180 of the housing 110. In one aspect, the alarm signal is transmitted to one or more remote alerting system or servers by the processing circuit 340.

The tag 100 includes a power supply 410 electrically coupled with the processing circuit 340 and the control mechanism. In some aspects, the power supply 410 is a battery. As described in foregoing paragraphs, the control mechanism establishes connection between the power supply 410 and the processing circuit 340 when the locking arm 120 is depressed in the channel 190, and disconnects the connection between the power supply 410 and the processing circuit 340 when the locking arm 120 is in unlocked state.

The tag 100 includes a sensor, transmitter, or the like to transmit a detectable signal when it is located within a monitored surveillance zone. A detaching device can remove the tag 100 when surveillance is not necessary (e.g., after the item has been purchased). While the tag 100 is attached to, for example, an article of clothing, a monitoring system monitors the surveillance zone for the tag signal to ensure that the article of clothing including the tag is not removed from the surveillance zone without triggering an alarm or the like. If the article with a tag 100 is tried to be removed from the surveillance zone, the monitoring system triggers an alarm. In some aspects, the transmitter is a radio frequency identification (RFID) unit disposed in the housing 110 of the tag 100. The RFID may also provide a method of tracking inventory within a retail location. In other words, the RFID may provide serial numbers, model, sizes, etc. when scanned by a RFID reader. The RFID reader may be a handheld reader or a mounted reader. The RFID can operate within the known frequency bands based upon determined requirements. In some aspects, the transmitter is an electronic article surveillance unit.

Figure 7:
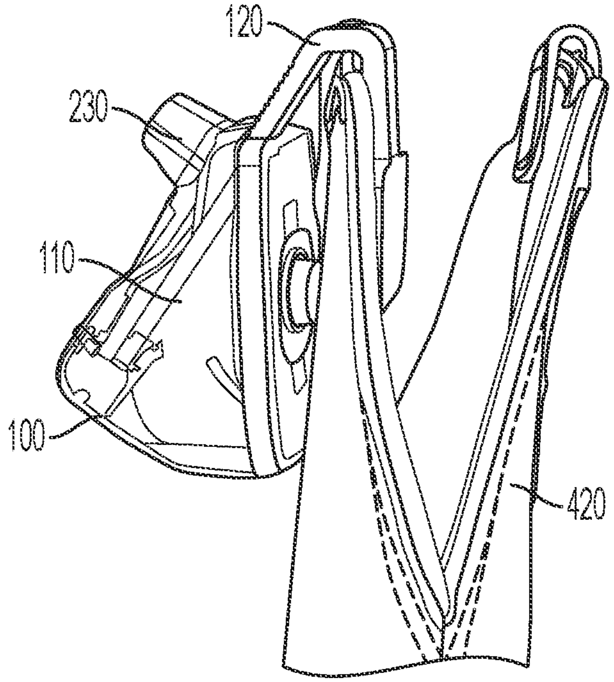
FIG. 7 is a side view of the tag coupled with an article in an unlocked state, in accordance with aspects of the present disclosure.
Figure 8:
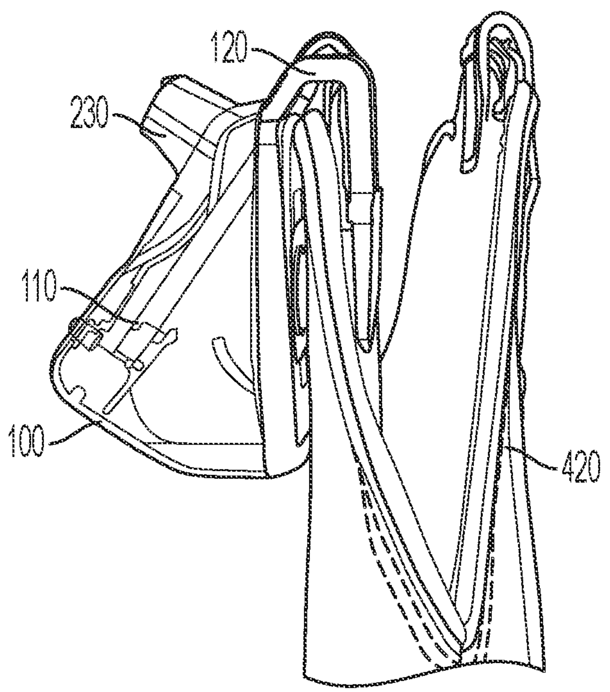
FIG. 8 is a side view of the tag coupled with the article of FIG. 7 in a locked state, in accordance with aspects of the present disclosure.

Operation of the tag 100 is now described. Referring to FIG. 7, the tag 100 is shown coupled with an article 420 in an unlocked configuration. Referring to FIG. 8, the tag 100 is shown coupled with the article 420 in a locked configuration. As shown in FIG. 7, initially, the tag 100 is coupled with the article 420. Typically, the article 420 is received in the space between the housing 110 and locking arm 120. To lock the tag 100 with the article 420, the locking arm 120 is pressed in the channel 190. Due to the pressing, the pad 310 and the cushioning member 320 firmly abut the article 420. Further, as the locking arm 120 is depressed in the channel 190, the circuit 250 is activated. In this configuration, the tag 100 is said to be in the locked configuration. If the tag 100 is tampered with by forcefully trying to decouple the tag 100 from the article or trying to damage the tag 100, there is relative motion between the first contact 270 and the second contact 280. If the tag 100 is twisted or moved either, up, down or laterally (left or right), the housing 110 will shift, but the second contact 280 which will stay in a place because the resilient members 330 will allow a predetermined amount of movement. The first contact 270 will travel away from the second contact 280. If the tag 100 moves more than a predetermined distance, the first contact 270 and the second contact will not touch thereby breaking the electronic loop and causing the alarm to trigger.

In other words, due to the relative motion, the electrical contact between the first contact 270 and the second contact 280 breaks. This is detected by the processing circuit 340 and subsequently an alarm is triggered. To safely remove the tag 100, the unlocking means are utilized to unlock the lock 230. Once the lock 230 is unlocked, the locking arm 120 is released and under the influence of the biasing member 210, the locking arm 120 is displaced in the direction towards opening of the channel 190. Due to this, the processing circuit 340 is deactivated.

The tag 100 provides two layers of security, i.e., the lock 230 and the circuit 250. The lock 230 prevents any unauthorized removal of an article, whereas the circuit 250 prevents tampering with the tag 100.

Figure 9E:
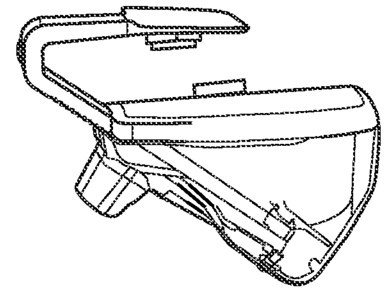
FIGS. 9*a*, 9*b*, 9*c*, 9*d* and 9*e* are views of the tag of FIG. 1, in accordance with aspects of the present disclosure.
Figure 9D:
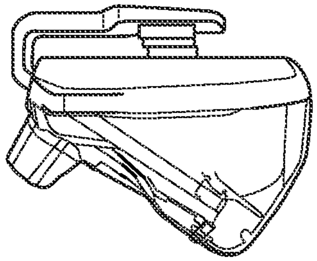
Figure 9C:
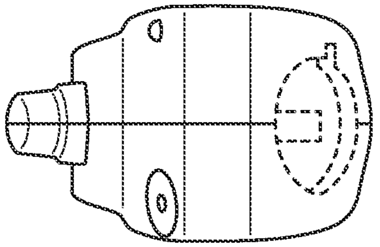
Figure 9B:
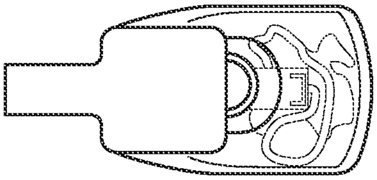
Figure 9A:
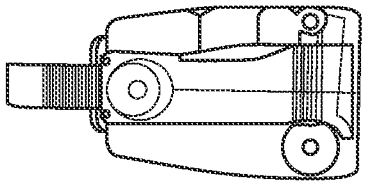
Figures 10A, 10B:
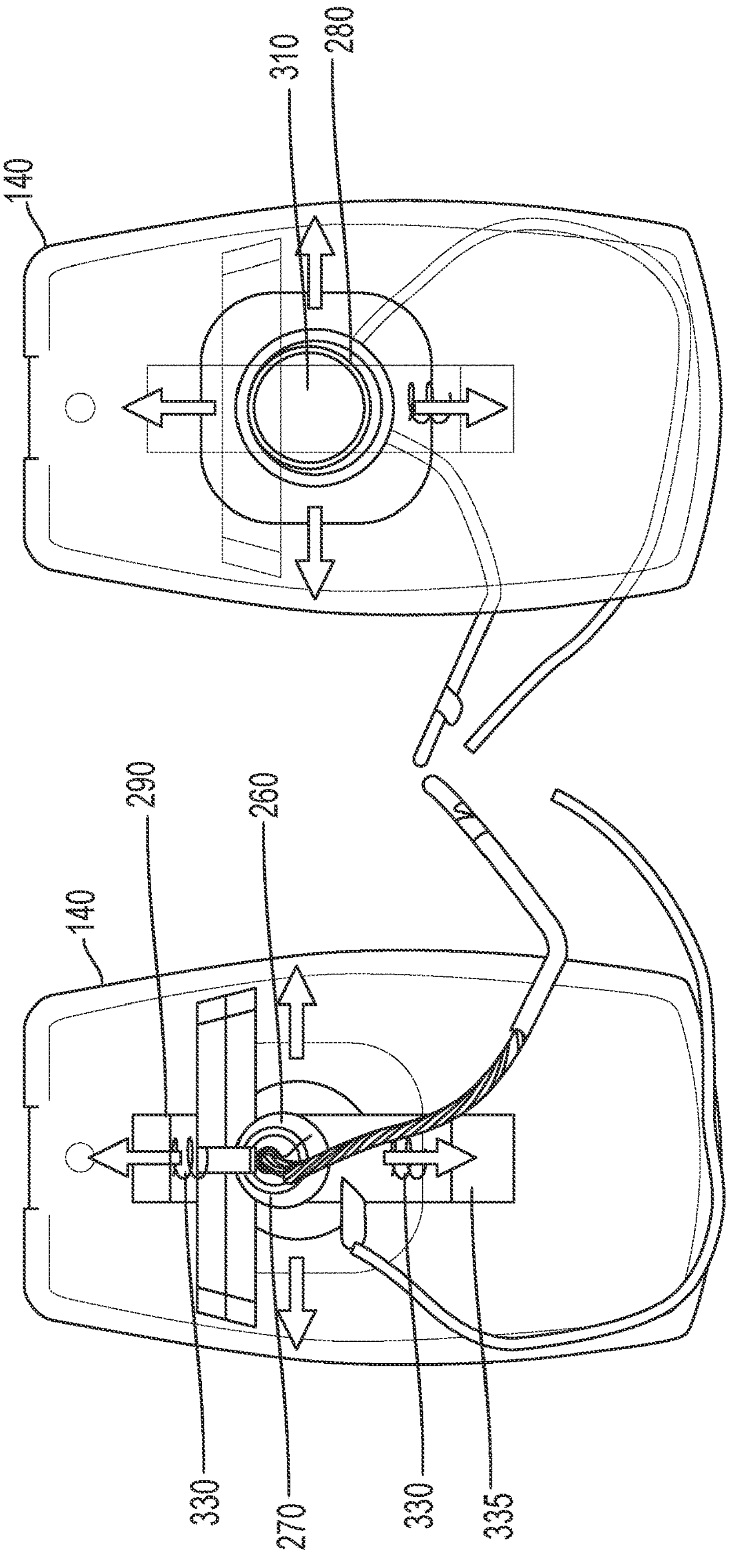
FIG. 10*a* and FIG. 10*b* are a back and front view, respectively, of portions of the tag of FIG. 1 depicting components within a housing of the tag, in accordance with aspects of the present disclosure.

Further, FIGS. 9*a*, 9*b*, 9*c*, 9*d* and 9*e* are views of the tag 100, described above, in an isolated state. FIG. 9*a* is a front view of the tag 100. FIG. 9*b* is a rear view of the tag 100. FIG. 9*c* is a bottom view of the tag 100. The area illustrated in dashed lines shows the location of a power source, for example, a battery. FIG. 9*c* is a side view of the tag 100 in a locked state, as described above. FIG. 9*d* is a side view of the tag 100 in an unlocked state.

The construction and arrangement of the systems and methods as shown in the various exemplary aspects are illustrative only. Although only a few aspects have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative aspects. Other substitutions, modifications, changes, and omissions can be made in the design, operating conditions and arrangement of the exemplary aspects without departing from the scope of the present disclosure.

The present disclosure contemplates methods, systems and program products on any machine-readable media for accomplishing various operations. The aspects of the present disclosure can be implemented using existing computer processors, or by a special purpose computer processor for an appropriate system, incorporated for this or another purpose, or by a hardwired system. Aspects within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

The order of method steps may differ from what is described. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. An article surveillance tag comprising:

a housing;

a switch including a first contact coupled with the housing and a second contact configured to be coupled with an article, the second contact is movable relative to the first contact; and a processing circuit configured to detect an electrical connection when the first contact and the second contact touch, and further configured to detect an electrical disconnection between the first contact and the second contact when the first contact and the second contact do not touch, and trigger an alarm upon detecting the electrical disconnection.

2. The article surveillance tag of claim 1, wherein the first contact is supported by one or more brackets within the housing.

3. The article surveillance tag of claim 1, wherein the second contact is arranged in the housing and coupled with the article via a pad extending out of the housing.

4. The article surveillance tag of claim 1, further comprising one or more resilient members between the second contact and the housing to allow the second contact and configured to regain a position of the second contact after displacement.

5. The article surveillance tag of claim 4, wherein the one or more resilient members include springs.

6. The article surveillance tag of claim 1, wherein the processing circuit verifies the electrical disconnection based on one of current levels or voltage levels.

7. The article surveillance tag of claim 1, further comprises a locking arm extending from the housing.

8. The article surveillance tag of claim 7, wherein the article is placed in a space between the locking arm and the housing.

9. The article surveillance tag of claim 7, further comprises a lock for retaining a position of the locking arm.

10. The article surveillance tag of claim 7, wherein the locking arm is receivable in a channel configured in the housing.

11. The article surveillance tag of claim 10, wherein the housing further comprises a biasing member arranged between a base of the channel and an end of the locking arm received in the channel, the biasing member is configured to be compressed when the locking arm is depressed in the channel.

12. The article surveillance tag of claim 11, further comprises a control mechanism provided to determine a position of locking arm, and configured to allow power supply to the processing circuit when the locking arm is depressed in the channel.

13. The article surveillance tag of claim 6, when the processing circuit verifies the electrical disconnection, the processing circuit generates an alarm signal.

14. The article surveillance tag of claim 13, further comprises a light emitting diode (LED) or a speaker.

15. The article surveillance tag of claim 14, wherein the alarm signal illuminates the LED or generates an audible signal from the speaker in response to the alarm signal.

16. The article surveillance tag of claim 6, further including a power source.

17. The article surveillance tag of claim 16, wherein the power source includes a battery.

* * * * *